(12) United States Patent
Wojtysiak (10) Patent No.: US 7,503,971 B2
(45) Date of Patent: Mar. 17, 2009

(54) RADIATIVE COOLING SURFACE COATINGS

(75) Inventor: Conrad Stephen Wojtysiak, Myaree (AU); John Wesley Butler, legal representative, Nedlands (AU)

(73) Assignee: Skycool Pty Ltd., Sydney (AU)

( * ) Notice: Subject to any disclaimer, the term of this patent is extended or adjusted under 35 U.S.C. 154(b) by 131 days.

(21) Appl. No.: 10/479,835

(22) PCT Filed: Jun. 3, 2002

(86) PCT No.: PCT/AU02/00695
§ 371 (c)(1), (2), (4) Date: Jun. 7, 2004

(87) PCT Pub. No.: WO02/098996
PCT Pub. Date: Dec. 12, 2002

(65) Prior Publication Data
US 2005/0064094 A1 Mar. 24, 2005

(30) Foreign Application Priority Data
Jun. 7, 2001 (AU) .................................... PR 5545

(51) Int. Cl.
*C04B 14/04* (2006.01)
*B05D 1/12* (2006.01)
*F21V 9/00* (2006.01)

(52) U.S. Cl. ...................... 106/482; 106/401; 106/483; 106/409; 106/415; 427/186; 252/582

(58) Field of Classification Search ................ 106/482, 106/483, 409, 401, 415; 427/186; 252/582; 52/173
See application file for complete search history.

(56) References Cited

U.S. PATENT DOCUMENTS

| | | | | |
|---|---|---|---|---|
| 4,107,134 | A * | 8/1978 | Dawans | 523/220 |
| 4,624,113 | A | 11/1986 | Hull et al. | |
| 5,006,175 | A * | 4/1991 | Modly | 106/439 |
| 5,310,422 | A * | 5/1994 | Abdel-Latif | 106/635 |
| 5,500,313 | A * | 3/1996 | King et al. | 430/11 |
| 5,786,785 | A * | 7/1998 | Gindrup et al. | 342/1 |
| 5,811,180 | A * | 9/1998 | Berdahl | 428/324 |
| 6,454,848 | B2 * | 9/2002 | Sliwinski et al. | 106/459 |
| 6,787,585 | B2 * | 9/2004 | Rose et al. | 523/135 |
| 6,875,800 | B2 * | 4/2005 | Vanier et al. | 523/210 |
| 2001/0044489 | A1 * | 11/2001 | Hugo | 524/420 |

(Continued)

FOREIGN PATENT DOCUMENTS

JP 60-179474 9/1985

(Continued)

OTHER PUBLICATIONS

Tazawa, M., Jin, P., Miki,T., Yoshimura, K., Igrashi, K., Tanemura, S. "IR properties of SiO deposited on V1×W×W×O 2 thermochromic films by vacuum evaporation" Thin Solid Films, vol. 375 (2000) pp. 100-103.

*Primary Examiner*—Jerry Lorengo
*Assistant Examiner*—Veronica Faison Gee
(74) *Attorney, Agent, or Firm*—Gordon & Jacobson, PC (57) ABSTRACT

A surface coating composition which exhibits low solar absorption and preferential emission at wavelengths corresponding to atmospheric windows in the infra-red regions is provided by the addition of microspheres to a composition containing a solar reflective pigment.

25 Claims, 5 Drawing Sheets

U.S. PATENT DOCUMENTS

2003/0030041 A1* 2/2003 Genjima et al. ............. 252/587
2004/0068046 A1* 4/2004 Hugo ........................ 524/556

FOREIGN PATENT DOCUMENTS

| JP | 02-150475 | 6/1990 |
| JP | 11-323197 | 11/1999 |
| JP | 2000-126678 | 5/2000 |
| JP | 2000129172 | 5/2000 |
| JP | 2000-212475 | 8/2000 |
| JP | 2000-281894 | 10/2000 |
| JP | 2000-327740 | 11/2000 |
| JP | 2001-064544 | 3/2001 |

* cited by examiner

Figure 3 – December

Figure 4 – April

RADIATIVE COOLING SURFACE COATINGS

BACKGROUND TO THE INVENTION

This invention relates to surface coatings having radiative cooling properties and in particular to the use of such coatings on external surfaces of buildings to reduce the heat load to those buildings.

Radiative cooling refers to the process whereby a body will emit as radiation heat energy absorbed through normal convection and conduction processes.

The physics of black body radiation states that the wavelength at which a body will emit radiation is dependent on its temperature. For terrestrial temperatures, emission occurs in the infra-red (IR) wavelengths with a peak emission at approximately 11.4 μm. Incident solar radiation, on the other hand, corresponds to a black body temperature of 6000° K and is concentrated in the ultra-violet, visible and near IR wavelengths.

Not all of the radiation emitted by the Earth passes through to space. A significant portion of this radiation is absorbed in the Earth's atmosphere, particularly by the so-called "greenhouse gases" water vapour, carbon dioxide and ozone, and re-emitted back to the Earth's surface.

Figure 1:
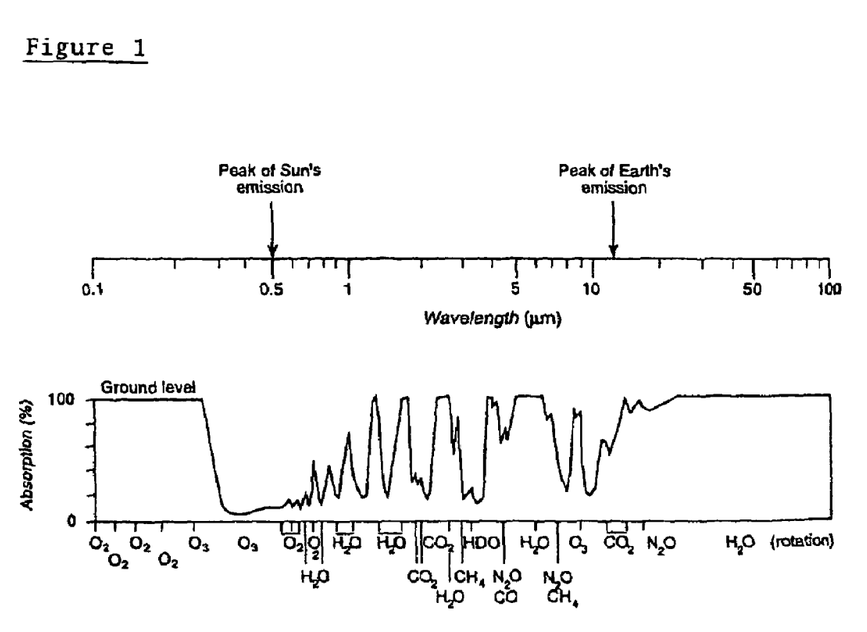
FIG. 1 shows a graph of atmospheric absorption versus wavelength.

FIG. 1 shows atmospheric absorption as a function of wavelength. The species responsible for the various absorption peaks are identified on the horizontal axis. There is a low absorption "atmospheric window" in the region of 8-13 μm where the atmosphere is relatively transparent. A similar window exists for some wavelengths within the 1-5 μm band. Radiation from the Earth's surface within these wavelengths is likely to pass through these atmospheric windows to space rather than absorbed by the atmosphere and returned to the Earth's surface.

For the wavelengths having high atmospheric absorption there will be significant amounts of radiation in the atmosphere as that radiation is absorbed and re-emitted back to Earth. Conversely, for the wavelengths corresponding to these atmospheric windows there will be little radiation in the atmosphere as the majority of radiation emitted by the Earth at these wavelengths is allowed to pass through the atmosphere to space.

A "selective surface" is one that exploits the atmospheric window by preferentially emitting thermal energy at wavelengths corresponding to these atmospheric windows where there is reduced incident radiation which may be absorbed by the surface, that allow rapid transfer of that radiation to space and by being non-absorptive of radiation outside these wavelengths.

SUMMARY OF THE INVENTION

The invention resides in a curable formulation for use as a radiative cooling surface coating for an external surface of a building characterised by low absorption at wavelengths of incident solar radiation and high radiative emittance at wavelengths of reduced incident radiation.

The invention is based on the discovery that such a coating may be obtained by the inclusion of a dispersion of gas or vacuum filled microspheres in a coating composition containing a solar reflective pigment. The microspheres employed are preferably of the silica type, most preferably having a shell of silica-alumina. Coatings according to the invention, incorporating effective amounts of such microspheres, have in fact demonstrated the ability to achieve below-ambient temperatures in the interior of coated structures, The microspheres employed in such coatings may be gas filled, for example with $CO_2$ or $N_2$, or they may be vacuum filled.

Preferably the coating is not only non-absorptive of solar radiation but is reflective, rather than transmissive, of these wavelengths. Preferably the coating has a solar reflectance greater than 80% and more preferably greater than 84%.

Preferably the coating is characterised by radiative emittance ($\epsilon$) greater than 85%, more preferably greater than 90% and still more preferably greater than 95% at thermal wavelengths.

The combined effect of the solar absorption and radiative emittance characteristics of the coating are such that the coating is able to absorb heat energy from within an internal air space and re-radiate that energy as thermal radiation to achieve net radiative cooling of the air space.

The coating of the invention, when applied to a sheet steel surface exposed to solar radiation at Air Mass 1.5 Solar Spectrum and ambient temperature of 20-28° C. the formulation displays a net radiative cooling effect to the air space below the steel sheet.

Preferably, the formulation of the invention is curable and may be applied to an existing building using a large area spray process.

BRIEF DESCRIPTION OF THE DRAWINGS

Preferred embodiments of the invention will now be described by way of non-limiting examples and with reference to the accompanying figures in which.

DESCRIPTION OF PREFERRED EMBODIMENTS OF THE INVENTION

A formulation according to the invention was manufactured as follows. Quantities given are for a total 600 L mix and are provided for illustrative purposes only. Though precise quantities are stated, wide variation from these quantities, even down to zero for some components, are possible and within the scope of the invention 610 g of a sequestrating and wetting agent, preferably a polyphosphate and 610 g of a dispersing agent was added to 91 L of water in a mixing drum and mixed at 2000 rpm for 10 minutes or until the ingredients are thoroughly dispersed. To this mix was added a solar reflective pigment such as rutile grade Titanium Oxide ($TiO_2$) (38 kg), 72 kg of a filler such as $CaCO_2$ or $MgCO_2$ that lends water resistance to the cured formulation, and 72 kg of a suspension agent e.g. $MgSiO_3$, $BaSO_4$ or $SiO_2$ that is also abrasion and corrosion resistant on metals. The mix was then dispersed at approx 2000 rpm for 1 hour. The actual mixing times will depend on the particle size. It is preferred that mixing continues until the mixture is brought to a Hegman setting of 7 giving about 15 microns measured on a Hegman Grind Gauge.

Approx 228 L of a binder such as a styrene acrylic, acrylic resin, homopolymer or PVA was then added and mixed for 15 minutes at 1500 rpm.

Approx 3.8 L of a defoaming agent, preferably non-silicon based, was then added and mixed for 10 minutes at 1500 rpm.

1.9 L of ammonia or other suitable alkali is added to adjust the pH to a range suitable for the addition of thickening agents. The ammonia was mixed for 10 minutes at 1100 rpm.

Next was added a coalescing agent such as any trimethylpentandiol, e.g. Isonol (4.8 L) and mixed for 15 minutes at 1100 rpm.

Propylene Glycol or other suitable glycols that act as a further coalescing agent and adjust the curing time were added and mixed for 5-10 minutes at 1100 rpm.

400 g of a non-toxic, broad range biocide was added and mixed for 5-10 minutes at 1100 rpm. The biocide may include a uni-fungicide, bactericide, insecticide and algaecide and is preferably devoid of heavy metals.

A thickening agent, preferably selected from the hydroxycellulose group (630 g) was pre-dissolved in 10 L of water and then added and mixed into the main mixture for 10-15 minutes at 1100 rpm. The mixture thickened with the addition of this component. The viscosity was measured using a No. 4 Ford Cup and adjusted until a run through time of 35 seconds was achieved with allowances made temperature.

A plasticiser (10 L), preferably phthalate, was added and mixed for 10 minutes at 1100 rpm.

The final mixing step was to add a microspheres component, in this example 70-90 kg, which was mixed for approx 30 minutes at a reduced rate of 200-300 rpm to avoid damage to the spheres. The microspheres were approximately 45 $\mu$m-150 $\mu$m in diameter (average 50 $\mu$m is preferred) having a silica-alumina shell between 0.3 $\mu$m and 1 $\mu$m thick and a filling of $CO_2$. The spheres form a fine light powder and are believed to enhance the emissivity of the coating at least in the wavelengths of the atmospheric windows. While $CO_2$-filled microspheres were used in this example, the spheres can be vacuum filled to a pressure of 4 Torr or can be filled with another gas, for example $N_2$.

The above ingredients other than the microspheres were chosen from those available primarily for their low solar absorption and high thermal emittance properties as well as for their properties that make them suitable for use as a roof coating, e.g. fire retardant, corrosion resistance, biocide etc. Those skilled in the preparation of paints and curable surface coatings will understand that the proportions of the ingredients Propylene Glycol or other suitable glycols that act as a further coalescing agent and adjust the curing time were added and mixed for 5-10 minutes at 1100 rpm.

400 g of a non-toxic, broad range biocide was added and mixed for 5-10 minutes at 1100 rpm. The biocide may include a uni-fungicide, bactericide, insecticide and algaecide and is preferably devoid of heavy metals.

A thickening agent, preferably selected from the hydroxycellulose group (630 g) was pre-dissolved in 10 L of water and then added and mixed into the main mixture for 10-15 minutes at 1100 rpm. The mixture thickened with the addition of this component. The viscosity was measured using a No. 4 Ford Cup and adjusted until a run through time of 35 seconds was achieved with allowances made temperature.

A plasticiser (10 L), preferably phthalate, was added and mixed for 10 minutes at 1100 rpm.

The final mixing step was to add a microspheres component, in this example 70-90 kg, which was mixed for approx 30 minutes at a reduced rate of 200-300 rpm to avoid damage to the spheres. The microspheres were approximately 45 $\mu$m-150 $\mu$m in diameter (average 50 $\mu$m is preferred) having a silica-alumina shell between 0.3 $\mu$m and 1 $\mu$m thick and a filling of $CO_2$. The spheres form a fine light powder and are believed to enhance the emissivity of the coating at least in the wavelengths of the atmospheric windows. While $CO_2$-filled microspheres were used in this example, the spheres can be vacuum filled to a pressure of 4 Torr or can be filled with another gas, for example $N_2$.

The above ingredients other than the microspheres were chosen from those available primarily for their low solar absorption and high thermal emittance properties as well as for their properties that make them suitable for use as a roof coating, e.g. fire retardant, corrosion resistance, biocide etc. Those skilled in the preparation of paints and curable surface coatings will understand that the proportions of the ingredients will be adjusted to the particular application. For example, in the above formulation a relatively small quantity of white pigment ($TiO_2$) is employed, and this can be increased where appropriate.

Coating compositions containing greater concentrations of microspheres, for example 140 Kg per 600 l, can be used to advantage. Higher concentrations, for example 150 Kg per 600 l, may also be used.

The preferred composition has at least 40% solids, more preferably at least 60% solids and still more preferably at least 70% solids.

The resultant mixture can be sealed and stored ready for application. The composition can be coated onto any exterior surface but is preferably applied to roofs that have a clear view of the sky to ensure maximum radiative cooling. A large area coating, e.g. on a warehouse roof, is best achieved by a spray coating process, for example using a Graco™ airless spray gun with Tungsten Carbide tip.

The coating may be applied as a single thick layer but will more typically be built up from a series of thin layers. The thickness at which a single layer of the coating can be applied will depend on the viscosity of the formulation and the flatness of the surface. A sloping, undulating or rough surface will require the application of thinner coats to ensure the overall coating is of even thickness across the surface.

If the coating is too thick it may act as a blanket for the building and retard the transfer of heat from the internal air space to the coating for radiative emission resulting in higher interior temperatures. It is thus preferred that the thickness of the coating is less than 10 mm.

Coatings manufactured in accordance with the above example have been found by optical measurement to exhibit a hemispherical solar absorptance of 0.15, and thermal emittance estimated from measured roof heat loss coefficients is greater that 0.9. The observed radiative capability and IR spectra of the material are such, however, as to indicate the existence of selective radiative ability in the 8 to 13 $\mu$m atmospheric window.

Comparative tests have been conducted between the composition of the invention and conventional roofing systems. In the first of these test, four steel boxes, approx 330 mm×330 mm×760 mm, open at one end, were used in the tests. The boxes were inverted (i.e. open end down) so that the bottom of the box became the roof for the purpose of the test. Each box bad its side walls lined with insulating batts rated at R=1.5. Two boxes had outer surfaces of bare steel, and one of these had the underside of its roof insulated with the same batts as used on the walls. The third box was of off-white Colorbond steel, and the remaining box had the exterior side of its roof coated to a thickness of approx 0.7 mm with the composition of the invention, prepared as above.

Figure 2:
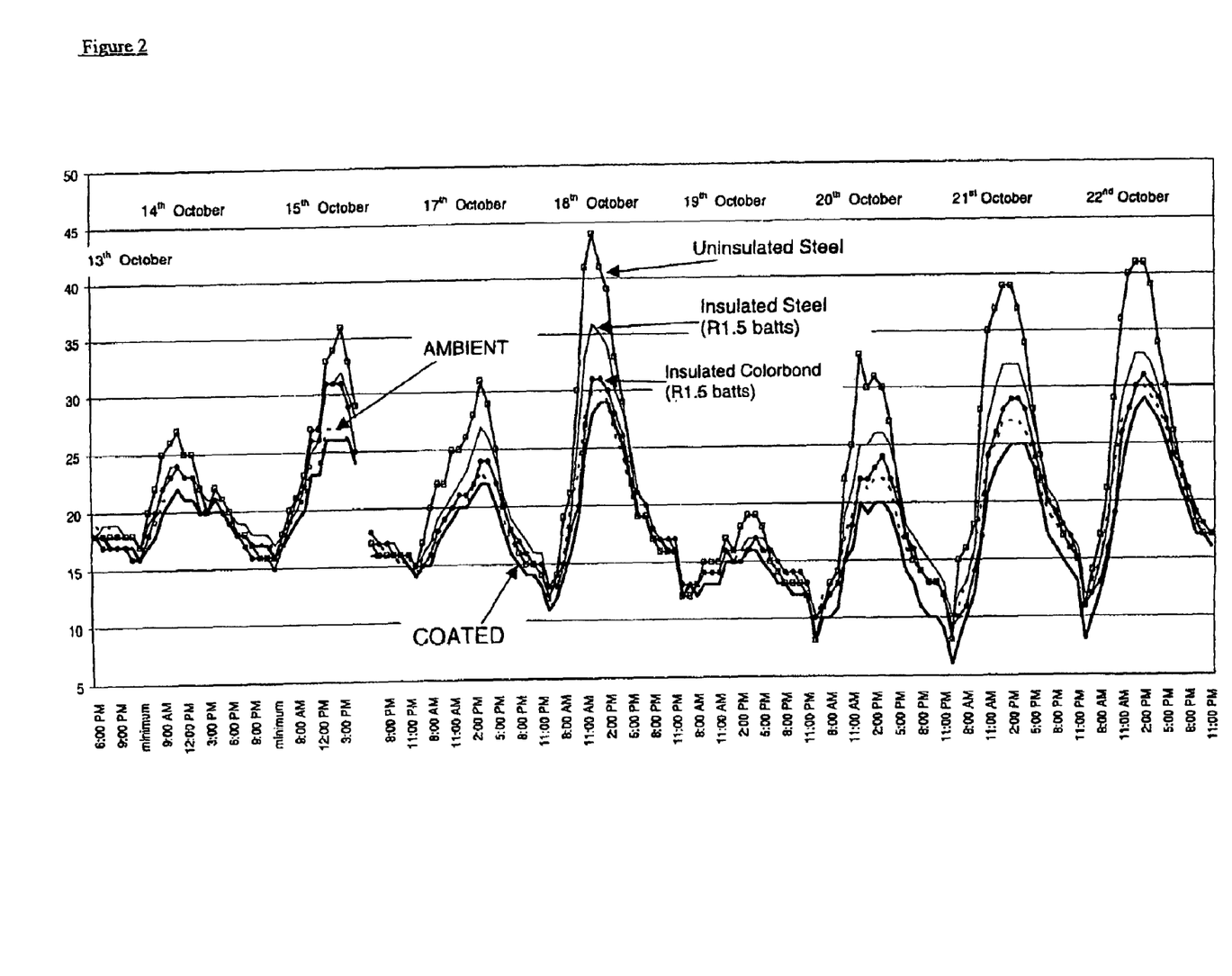
FIG. 2 shows the results of comparative testing of a coating according to the invention against conventional roofing systems.

The test boxes were disposed outside with each box having a clear view of the sky. Internal temperature readings were taken hourly for a period of 10 days. Ambient outside temperatures were also recorded. The results are graphed in FIG. 2 where the composition of the invention is referenced using the present applicant's trade mark Insulshield™. As is evident from the results, the coatings of the invention performed remarkably better than the existing roofing systems in maintaining a low temperature in the interior space of the test box and was the only product to consistently provide interior space temperatures below ambient.

It should be noted that the test period covered predominantly cloudless days and nights and that under more overcast conditions the performance of the coatings of the invention is reduced. However, even under these conditions, the coatings of the invention still out performed the prior art systems.

In a further test, an uninsulated steel enclosure was coated with a formulation of the invention, allowed to cure and then subjected to solar radiation at 1062 $Wm^{-2}$ incident on the horizontal at ambient temperature of 23° C. with clear sky conditions. The total radiation energy off the roof of the enclosure comprised 894 $Wm^{-2}$ of reflected solar energy and 188 $Wm^{-2}$ of re-radiated heat (1R). The total energy output of 1082 $Wm^{-2}$ was thus greater than the incident solar energy. This suggests that the coated roof was able to absorb heat energy from the air space within the enclosure and output that energy to the atmosphere.

For a similar enclosure having an insulating layer beneath the roof, the net energy output was 1064 $Wm^{-2}$ which is less than for the uninsulated case but is still sufficient to achieve a small net cooling effect, even in conditions of high incident solar radiation.

Under clear sky night time conditions, radiative cooling continued but without the solar heat load. At 11 pm, the internal temperature in the uninsulated enclosure was 16.4° C. compared with 20° C. ambient and at 2 am the internal temperature was 15.7° C. compared with 18.8° C. ambient. In the insulated case, the internal temperatures were slightly above ambient.

From a comparison between the underside roof temperatures of an uncoated steel roof (56° C.) and a similar steel roof coated according to the present invention (33° C.), it can be seen that coatings of the invention when applied to roof structures can reduce the solar heat load to the internal air space due to the coating's high solar reflection properties. Because there is very little solar heating of the roof, the roof can instead absorb heat from the internal air space below the roof. The high IR emittance properties of the coating allow this absorbed heat to be efficiently radiated away from the roof, thus achieving a net cooling effect to the air space.

Furthermore, because there can be a significant temperature gradient within the air space, with the temperature just below the roof being up to several degrees higher than at the base level, this radiative cooling effect can continue to the point where ground level temperatures significantly below ambient are obtained.

In a second series of tests, a field trial was conducted from December 2000 to April 2001 to evaluate the performance of the coating in a demountable classroom environment. Portable classrooms are widely used in Australia and have a reputation for overheating, particularly in the summer.

The coating of the invention is intended principally for the commercial and industrial metal-roofed buildings which generally have a much larger roof area than exterior wall surfaces area. The demountable classrooms present a "worst case scenario" in which to trial the coating for the following reasons:

low roof to wall ratio, unlike supermarkets or warehouses,
sub-roof insulation, which delays internal heat reaching the coating thereby creating a time lag when compared to ambient air temperature movements,
a relatively high occupancy rate of about 3 $m^2$ per person, which is about twice the density of a standard supermarket,
open windows and ceiling fans that permit a high rate of external air exchange thereby increasing the difficulty for the coating to maintain internal temperatures constantly below ambient.

Despite these challenges the coating performed extraordinarily well. The maximum daily temperature of the coated room during the occupied period of the trial (February to April, 2001) was maintained at or below ambient for 84% of the time. During the unoccupied period, the coated room's peak temperature was at or below ambient 81% of the time, with differing weather conditions accounting for the variation.

Figure 5:
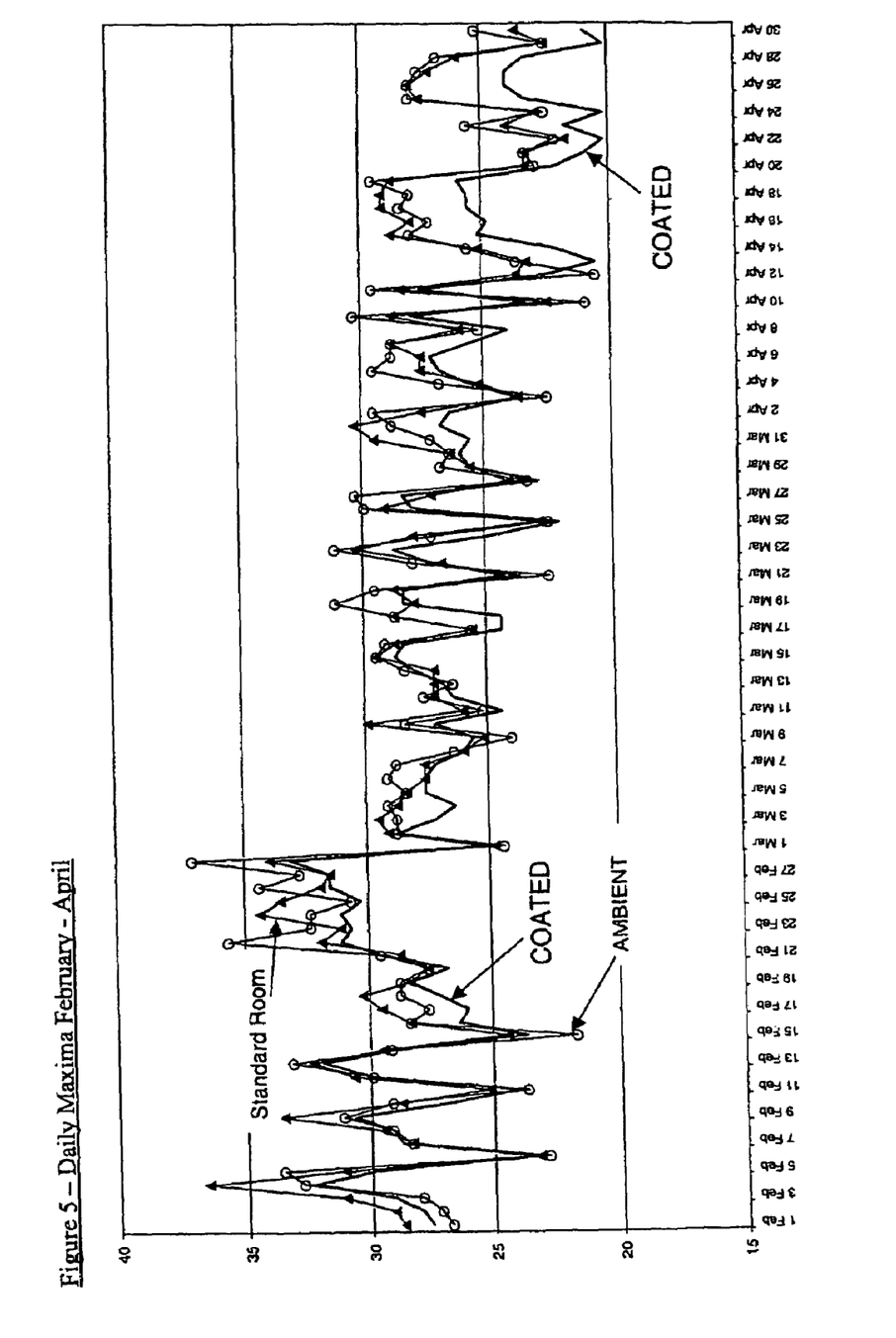

Temperature recorders were located adjacent to the teacher's blackboard at a height to correctly record the temperature of the occupied portion of the room. The graphs of FIG. 5 shows the results of observations in two rooms used in the test, one of which was roof-coated with the composition of the invention. (Another uncoated room contained a small window-mounted air conditioning unit, and there was no control over its use. The unit was, however, at the end of the classroom remote from the temperature sensor, and in fact the corresponding graphs for this room show that it had no appreciable affect on the measured temperature. The graphs for that room are therefore not included here). The rooms had shaded walls, while their roofs was not affected by any shading factors.

Figure 3:
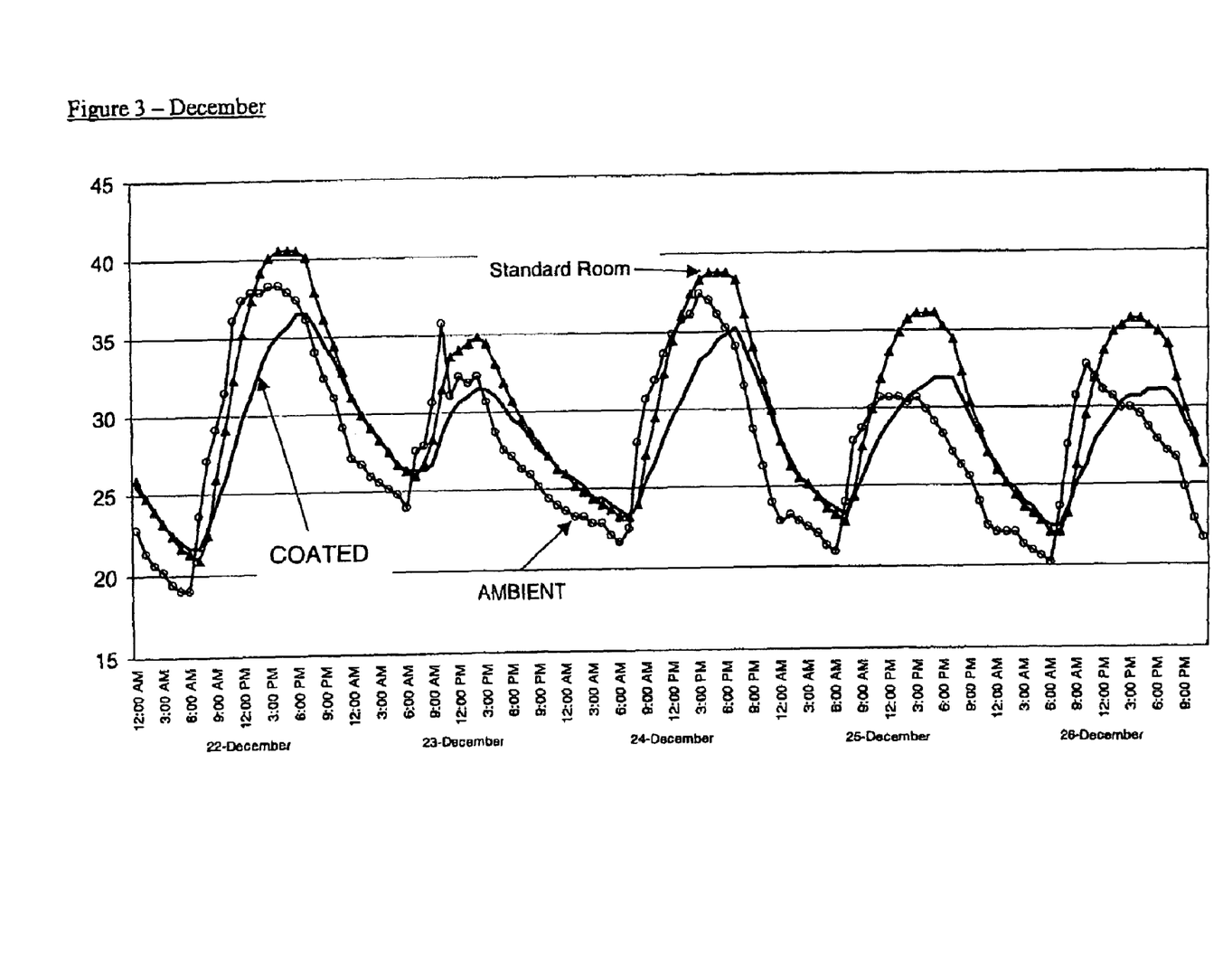
FIGS. 3 to 5 show the results of further comparative testing of the invention

The results presented in the following graphs are taken from three periods within the trial:

FIG. 3: late December, 2000—being the warmest period, and

Figure 4:
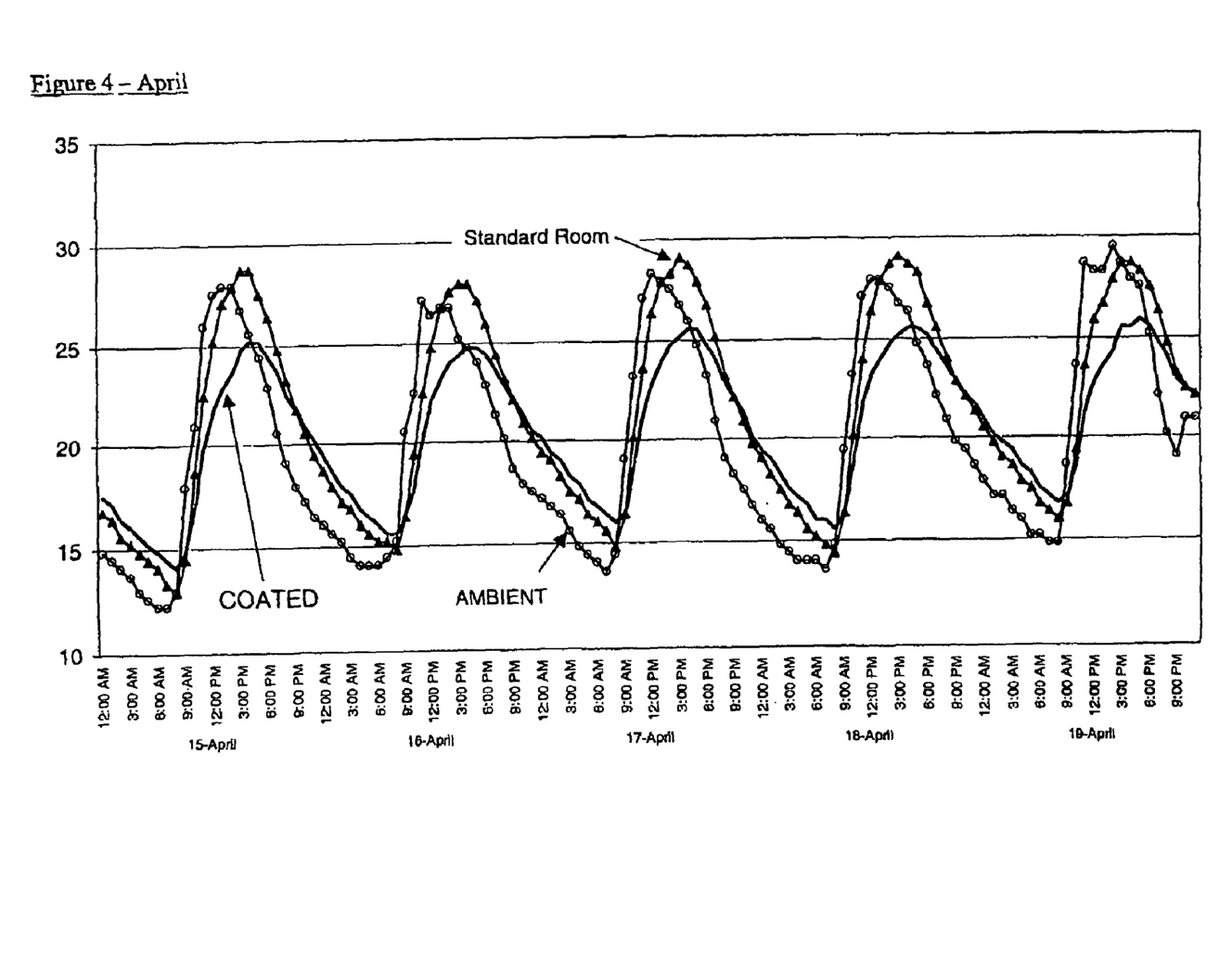

FIG. 4: mid April, 2001—being the coolest period,

FIG. 5: February to April, 2001—being the occupied period and showing daily peak temperatures.

Although there were many environmental factors beyond the control of the trial including cloudy weather, air-exchange factors and room population, the coating produced excellent results over the whole period.

Reference to FIG. 3 shows that on the hottest day in December the ambient temperature reached 38° C. by 12 p.m. and the unquoted class rooms peaked at 41° C. by 3 p.m. However, the coated room was 8° C. cooler than ambient at midday, 4° C. cooler by 3 p.m. and 7° C. cooler than the other rooms.

Overall, it can be seen that when the ambient reached its peak on most days the coated room was generally around 6° C. to 7° C. below ambient. Although the temperature in the coated room reached its peak several hours later, often around 4-6 p.m., it rarely reached the maximum ambient temperature.

Also apparent from FIG. 3 is the fact that the coated room commenced cooling usually when ambient temperature fell to that of the coated room. As noted above, the time lag in the cooling of the coated room would be primarily due to the sub-roof insulation trapping internal heat which would have entered the building through air exchange or being generated from internal sources including people.

In relation to FIG. 4 a significant observation is that the coated room maintained the more even flow of temperatures, While it was considerably cooler than the other rooms as well as ambient air, it also did not get as cold overnight. At the hottest time of each day, usually around midday to 2 p.m., the coated room was about 4° C. to 7° C. cooler than ambient and the other rooms. April 17th is a case in point. At 10:00 a.m. the coated room is still only 18° C. and ambient is 23° C. When ambient peaks at 12:00 p.m. it reaches 28° C., while the coated room is still a comfortable 22° C. The coated room eventually reached only 25.5° C. around 6 p.m., long after the room was no longer in use for the day.

As ambient temperature falls in the late afternoon the insulation traps the internal heat of the now closed room and prevents it from cooling at the same rate as ambient.

Without insulation the coated building will cool at almost the same rate as the outside ambient air. This enables the design of a more economical and environmentally efficient building.

FIG. 5 shows that for 84% of the occupied period the coated room was at or below the maximum ambient temperature and almost always well below the other rooms. The days on which the coated room was slightly higher than ambient are the coolest days, when there was predominant cloud cover since the coating requires a mainly clear sky to operate. This is the ideal—in cooler or cloudy weather it is usually desirable to retain a little more internal heat.

The present applicant has found that the radiative cooling coatings of the invention are most effective when used on roofs without underlying batt insulation. It is believed that the batt insulation, while providing a barrier to the ingress of absorbed solar radiation, retards the radiative cooling mechanism by reducing the transport of heat energy from the internal air space to the coating when it can be radiated to the atmosphere.

Coatings according to the invention provide a useful alternative to conventional methods for dealing with solar heat loads. However, the suitability of their use will very much depend on the environment in which they are to be employed. The coatings will be most suitable for use on buildings where the summer time cooling costs are greater than the winter time heating costs. While the experiments to date indicate that the coatings are best used on roofs without underlying insulation, the economics of the situation may dictate that due to winter heating considerations it is best that insulation is used.

It has been found that under overcast conditions, the radiative cooling effect is reduced and it is believed that this may be because the increased levels of water vapour in the atmosphere close the atmospheric window. This is especially important at night when radiative cooling can reduce the temperature of the internal air space well below ambient. The coatings are therefore more suitable for use in less cloud dominated environments, optimally with clear sky night time conditions.

The benefits of the invention include that less reliance can be placed on air conditioning to maintain low temperatures within an air space thus leading to reduced energy consumption. This has advantages for the local system in which the invention is utilised as well as wider environmental advantages including reduced production of greenhouse gases.

The formulation of the invention may include additional components such as a biocide, fire retardant, corrosion retardant etc. or alternatively, the previously described components can be selected for these properties.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein. It will further be understood that any reference herein to known prior art does not, unless the contrary indication appears, constitute an admission that such prior art is commonly known by those skilled in the art to which the invention relates.

The invention claimed is:

1. A surface coating composition for providing a surface coating having radiative cooling properties, the composition including a solar reflective pigment and a quantity of microspheres, said coating having a high reflectance of solar radiation, wherein said quantity of microspheres is effective to enhance the emittance of said coating such that said coating has a high radiative emittance in a wavelength range of 8 to 13 μm to emit thermal energy in said wavelength range.

2. A composition according to claim 1 in which the microspheres are silica microspheres.

3. A composition according to claim 2 in which the microspheres have a shell of silica-alumina.

4. A composition according to claim 1 in which the diameters of the microspheres are substantially between 45 μm and 150 μm.

5. A composition according to claim 4 wherein the average diameter of the microspheres is approximately 50 μm.

6. A composition according to claim 1 in which the microspheres have shell thicknesses substantially between 0.3 μm and 1 μm.

7. A composition according to claim 1, wherein said composition includes from substantially 60 to 150 kg of microspheres per 600 L of the composition.

8. A composition according to claim 1, wherein said composition includes from substantially 60 to 140 kg of microspheres per 600 L of the composition.

9. A composition according to claim 1, wherein said composition includes from substantially 60 to 70 kg of microspheres per 600 L of the composition.

10. A method of reducing temperature within a building relative to ambient temperature, said method including the step of applying a surface coating to the building, said coating including a solar reflective pigment and a quantity of microspheres, said coating having a high reflectance of solar radiation, wherein said quantity of microspheres is effective to enhance the emittance of said coating such that said coating has a high radiative emittance in a wavelength range of 8 to 13 μm to emit thermal energy in said wavelength range.

11. A method according to claim 10 in which the surface coating has a radiative emittance greater than 85% at thermal wavelengths.

12. A method according to claim 10 in which the surface coating has a solar reflectance greater than 80%.

13. A building having a roof with a surface coating having a composition according to claim 1.

14. A composition according to claim 1, wherein said coating is adapted to absorb heat and re-radiate said heat as thermal energy in said wavelength range.

15. A composition according to claim 1, wherein said coating has a radiative emittance greater than 85% at thermal wavelengths.

16. A composition according to claim 1, wherein said coating has a solar reflectance greater than 80%.

17. A composition according to claim 16, wherein said coating has a solar reflectance greater than 95%.

18. The method of claim 10, wherein said coating is adapted to absorb heat from within said building and re-radiate said heat as thermal energy in said wavelength range.

19. A method according to claim 12 in which the surface coating has a solar reflectance greater than 95%.

20. A method according to claims 10, including the step of applying said coating to a roof of said building.

21. A solar selective surface with a surface coating having a composition according to claim 1.

22. A composition according to claim 1, wherein the coating has a radiative emittance greater than 90% at thermal wavelengths.

23. A composition according to claim 1, wherein the coating has a radiative emittance greater than 95% at thermal wavelengths.

24. A method according to claim 16, wherein the coating has a radiative emittance greater than 90% at thermal wavelengths.

25. A method according to claim 16, wherein the coating has a radiative emittance greater than 95% at thermal wavelengths.

* * * * *